United States Patent [19]

Henricson

[11] Patent Number: 4,729,837
[45] Date of Patent: Mar. 8, 1988

[54] METHOD AND APPARATUS FOR THICKENING A SUSPENSION

[75] Inventor: Kaj O. Henricson, Kotka, Finland

[73] Assignee: A. Ahlstrom Corporation, Karhula, Finland

[21] Appl. No.: 859,818

[22] Filed: May 5, 1986

[30] Foreign Application Priority Data

May 20, 1985 [FI] Finland .................................. 851998

[51] Int. Cl.⁴ ............................................ F01D 33/10
[52] U.S. Cl. .................................... 210/784; 162/343; 209/270; 210/788; 210/791; 210/512.3
[58] Field of Search ..................... 210/416.1, 402, 407, 210/408, 512.1, 512.3, 791, 787, 780, 784, 787, 788; 162/343; 209/270, 288, 273, 289, 279, 290, 280, 291, 276, 293, 278, 296, 281, 269, 283

[56] References Cited

U.S. PATENT DOCUMENTS

| | | | |
|---|---|---|---|
| 3,223,239 | 12/1965 | Dick | 209/291 |
| 3,455,821 | 7/1969 | Aremaa | |
| 3,616,904 | 11/1971 | Aremaa | |
| 3,677,402 | 7/1972 | Holz | 209/291 |
| 3,870,638 | 3/1975 | Karpacheva et al. | |
| 4,043,919 | 8/1977 | Hutzler | 210/407 |

Primary Examiner—Frank Sever
Attorney, Agent, or Firm—Toren, McGeady & Associates

[57] ABSTRACT

A method and apparatus for thickening a pulp, in particular a pulp containing fibres. The pulp is thickened hydraulically while it flows through a space between two screen surfaces. Thickening on alternate screen surfaces is prevented for cleaning by closing the valves in the outlets. Pulp is removed from the screen surfaces by vanes.

17 Claims, 5 Drawing Figures

METHOD AND APPARATUS FOR THICKENING A SUSPENSION

The present invention relates to a method of continuously thickening a suspension, in particular a pulp containing fibres, whereby the pulp is thickened while it flows through a space between two screen surfaces by maintaining a pressure difference, which is required by the thickening, over the screen surfaces. The invention also relates to an apparatus for carrying out the above method.

Fiber material, in particular cellulosic and wood fibre pulp, is often treated as a dilute suspension. E.g. screening with perforated or slotted screens is carried out at a consistency of 1-3%. After the screening the fibre material must for various reasons be thickened to a higher consistency. The consistency is often raised to 10-15% e.g. for storage or bleaching.

Different suction filters are most commonly used as is described by literature on this field. By using these filters, the consistency of the pulp is increased by sucking water from the pulp through a screen surface, usually a wire cloth. When pulp is thickened by suction the maximum obtainable pressure difference over a screen surface is approx. 0.5 bar. This results from the fact that when strong suction is applied on the suction side of the screen, the low pressure causes the filtrate to boil.

If the thickening is carried out by using hydraulic pressure, i.e. the suspension which is fed into the device is kept under pressure, the above disadvantage is avoided. In principle there is no top limit to the pressure difference. In practice, however, the filtrate amounts will decrease with time as the thickened pulp covers the screen surface. Therefore the screen surface must be cleaned regularly to be able to utilize the high pressure difference. Laboratory tests have proved that e.g. with sulfate pulp the maximum thickening time without cleaning is 10-15 seconds.

A thickener operating with hydraulic pressure is disclosed eg. by U.S. Pat. Nos. 3,616,904 and 3,455,821. The devices disclosed by these publications utilize vibration for cleaning the screen surface. It has not, however, been possible to use these devices. The pulp is during the thickening so stuck to the screen surface that it does not flow towards the outlets without unreasonable pressure pulses or without means cleaning the screen surfaces. Too intensive pressure pulses in a pressurized thickener would cause severe problems in the structure of the device.

U.S. Pat. No. 3,870,638 discloses a method of cleaning a screen surface by back blows and pressure pulses, only. It is, however, difficult to time and adjust the back blow and the pressure pulse accurately so as to clean the screen, to make the thickened pulp flow on and to cause the dilute pulp to fill the thickening zone in the screen area in one quick movement.

The object of the present invention is to provide a method and an apparatus for thickening a suspension without the above disadvantages. The method of the present invention is characterized by the feature that the pulp is intermittently prevented from thickening on alternate screen surfaces and that the pulp thickened on the screen surface is removed when no filtrate flows through the screen.

The apparatus of the present invention is characterized by the features that at least one of the screen surfaces is stationary and the screen surface opposite to it rotates around a shaft and that at least one vane is disposed in the thickening zone between the stationary and the rotating screen surface at a short distance from the screen surfaces to move alternately in relation to the stationary screen surface and to the rotating screen surface and that the closing emans in the filtrate outlet can be closed intermittently.

According to the invention, thickening of the pulp is achieved hydraulicly by means of inlet pressure and the screen surface is cleaned at intervals which allow operation at a high pressure difference provided by the high inlet pressure. Operating in this way the received filtrate amount per screen surface is easily doubled compared with conventional suction methods.

The invention is described in detail below with reference to the drawings in which FIG. 1 is a schematic cross section of an embodiment of the invention;

Figure 1:
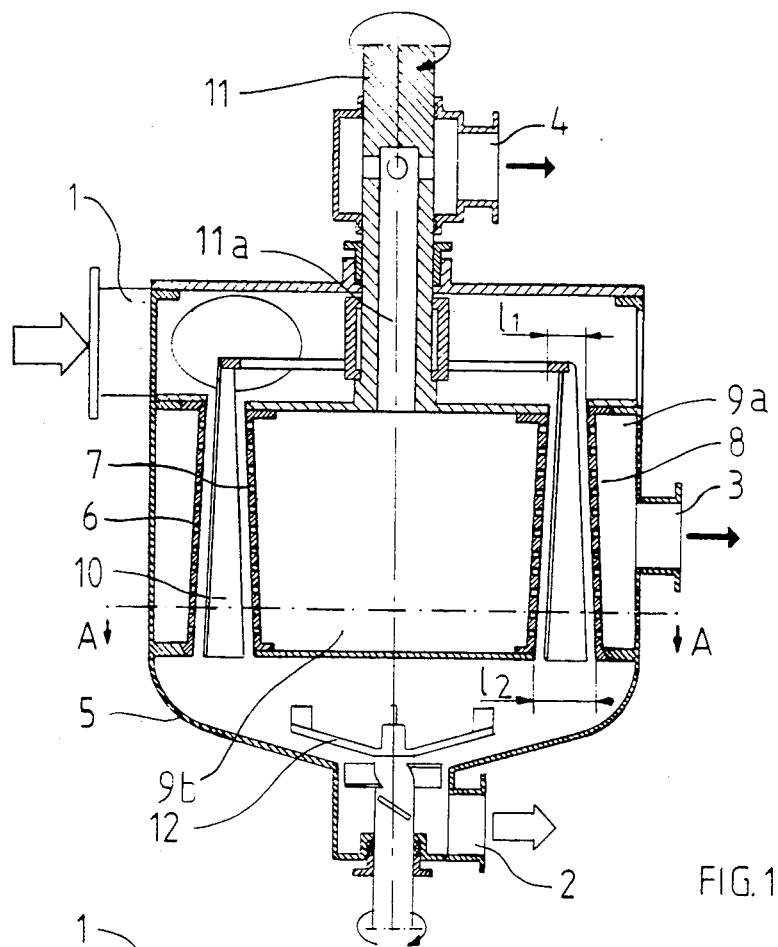
Figure 2:
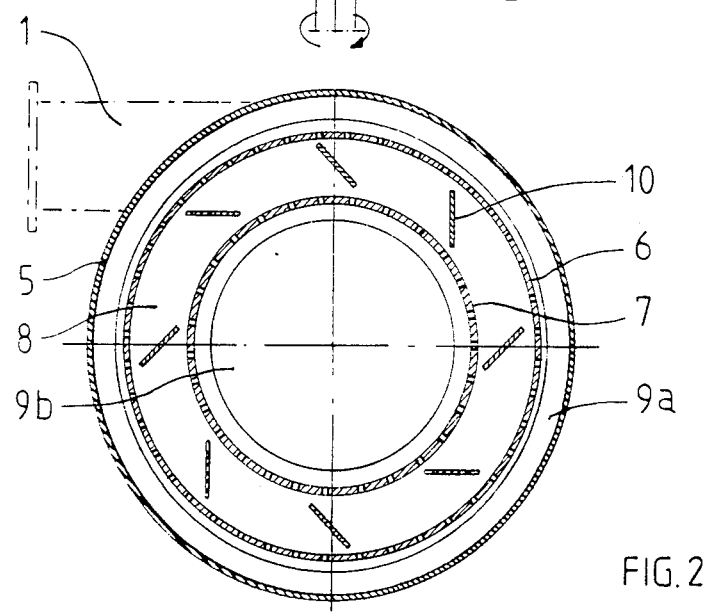
FIG. 2 is a section along line A—A in FIG. 1.

FIGS. 1 and 2 illustrate a cylindrical pressure-proof vessel 5. An inlet 1 for dilute pulp is provided at the top part of the casing of the vessel, and at the bottom part of it an outlet 2 for thickened pulp, and in one side casing of the vessel an outlet 3 for filtrate. The vessel also houses two slightly conical screen drums with screen surfaces 6, 7 disposed one inside the other. A filtrate space $9a$ communicating with the outlet 3 is formed between the outer, stationary screen drum and the casing of the vessel. The inner screen drum is rotatably mounted on bearings via shaft 11.

Figure 3:
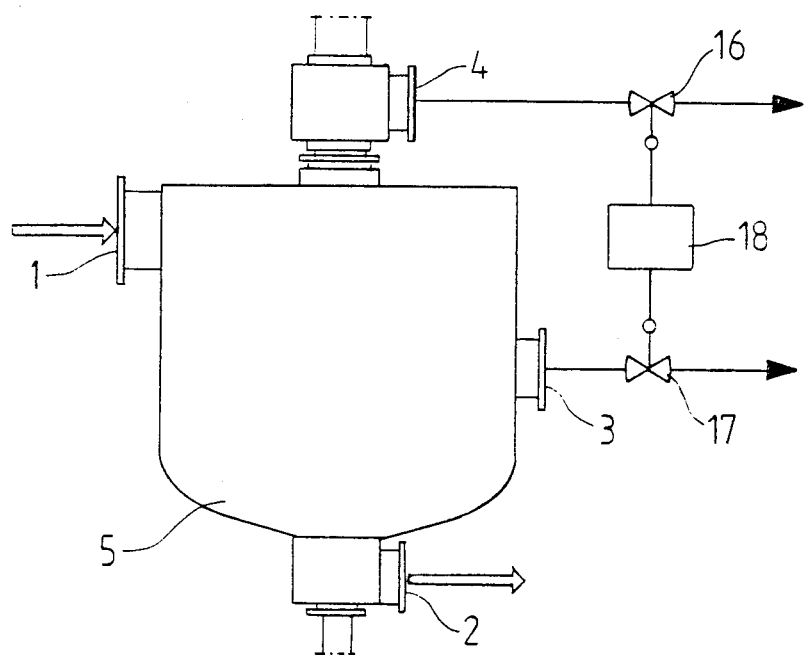
FIG. 3 is a schematic illustration of a regulating system included in the invention.

The ends of the inner screen drum are closed forming another filtrate space $9b$, which communicates with another filtrate outlet 4 via a channel $11a$ inside the shaft. The filtrate outlets 3, 4 are provided with closing means 16, 17 as is illustrated in FIG. 3. A regulating device 18 is disposed between the closing means.

The distance $l_1$ between the opposite screen surfaces 6, 7 by the dilute pulp inlet is smaller than the distance $l_2$ by the thickened pulp outlet.

In the embodiment illustrated in FIGS. 1 and 2, vanes 10 are disposed between the screen surfaces, which are by means of arms mounted free on bearings to the shaft 11. The vanes expand towards the thicker pulp according to the distance between the screens and are disposed at an oblique angle against the screen surfaces. A doctor 12 is disposed at the inside bottom of the vessel to guide the thickened pulp to the outlet 2. The doctor can function as a fluidizer to facilitate the flow of the pulp to the outlet.

The apparatus illustrated in FIG. 1 operates in the following way. Dilute pulp is supplied into the thickener 5 through the inlet 1. The pulp flows through the thickening zone 8 between the screen surfaces 6, 7 and is discharged in a higher consistency from the thickener through an outlet 2. The filtrate flows through the screen surfaces from the thickening zone to the filtrate spaces $9a$, $9b$. The deposited pulp on the screen surfaces 6, 7 causes the difference between the pulp inlet pressure and the filtrate pressures.

Cleaning of the screen surfaces is performed by the vanes 10. Cleaning of the stationary screen surface is carried out as follows: valve 17 after the filtrate outlet 3 illustrated in FIG. 3 is closed, whereby the pressure difference disappears and no screening takes place on the stationary screen surface 6. Filtrate is removed at this moment through the rotating screen surface 7, only. Pulp is deposited on the rotating screen surface 7, and the vanes 10, which are mounted free on bearings, stick to the deposited pulp.

Internal shear forces in the thickened high-consistency (8-15%) pulp are very strong compared with the dilute inlet pulp. The vanes start to rotate with the rotating screen surface 7. When the vanes move close to the stationary screen surface 6 the surface is cleaned. The cleaning can be intensified by blowing back through the screen, i.e. by creating pressure pulses on the filtrate side of the screen e.g. by means of a pump which causes the filtrate to flow towards the pulp thus cleaning the screen holes. The design and the angle of the vanes can be chosen to push the pulp from the stationary screen surface down towards the outlet 2. After a moment the thickening can be started again by opening the valve 17. When the stationary screen surface has worked for a while the rotating screen drum 7 is cleaned by closing valve 16 after the outlet 4 of the rotating screen surface filtrate space. The vanes stick to the deposited pulp on the stationary screen surface and their rotating movement is stopped. The screen surface 7 moves by the vanes and is cleaned.

Tests with sulfate pulp show that an appropriate time for the thickening is approximately 10 seconds after when a cleaning of 5 seconds is required. Thus, both screen surfaces would be approx. 65-70% of the time in operation which is substantially more than e.g. in conventional suction filters. Furthermore, greater pressure differences over the screen surfaces improve the capacity remarkably compared with suction filters.

The vanes 10 can be identical with the ones illustrated in FIG. 1 or preferably provided with slots or holes in the center through which the pulp can freely flow. The vanes can also be coupled to each other in pair to arrange one of them to rotate close to the stationary surface while the other one rotates close to the rotating screen surface. The movement of the vanes can be controlled by the position of the closing valve to clean that screen surface through which no filtrates flows. The vanes can be disposed perpendicular against the screen surfaces, in which case they are preferably not parallel with the shaft but at a small angle in relation to the shaft.

The regulating device 18 can be a timer, which intermittently closes one of the valves. It is also possible to employ a regulator the operation of which depends on the pressure difference between the filtrate space and the thickening zone. Also the regulator can close the valve partly, only.

Figure 4:
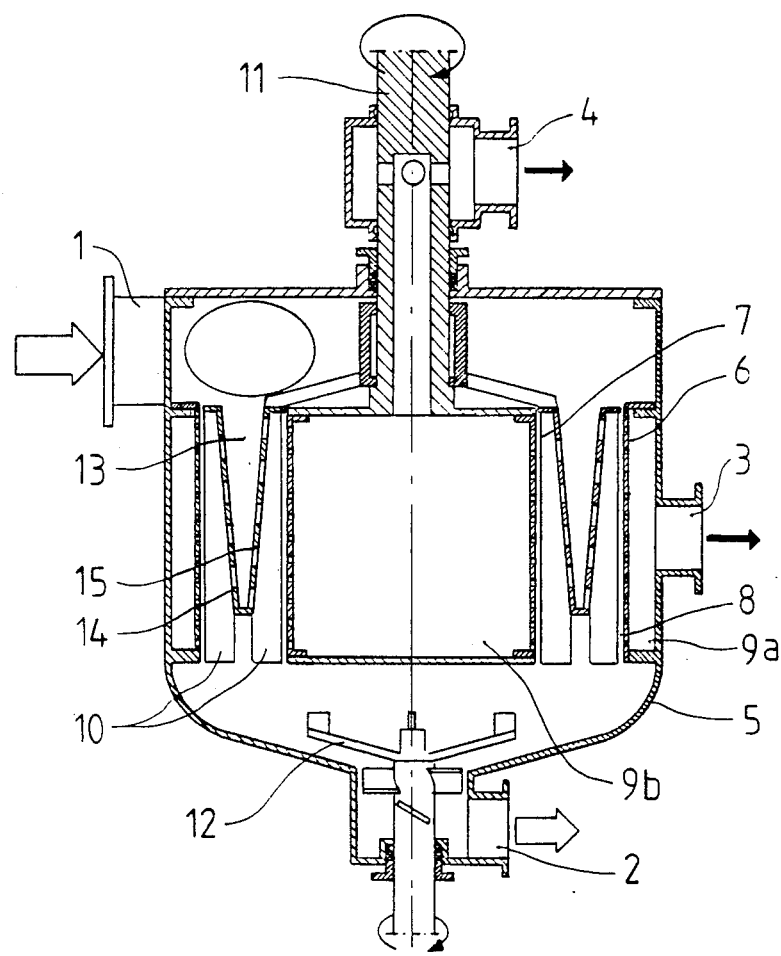
FIG. 4 is an other embodiment of the invention in an illustration corresponding to FIG. 1.

In the embodiment of the invention illustrated in FIG. 4, the thickening zone 8 of a thickener is provided with a dilute feed chamber 13. The feed chamber forms a space tapering in the direction of the flow between the screen surfaces. The walls of the feed chamber are formed by two large plates 14, 15 having large orifices such as holes or slots through which dilute pulp flows freely. The feed chamber distributes the pulp appropriately to the screens. The cleaning vanes 10 are fixed to the walls of the feed chamber.

Figure 5:
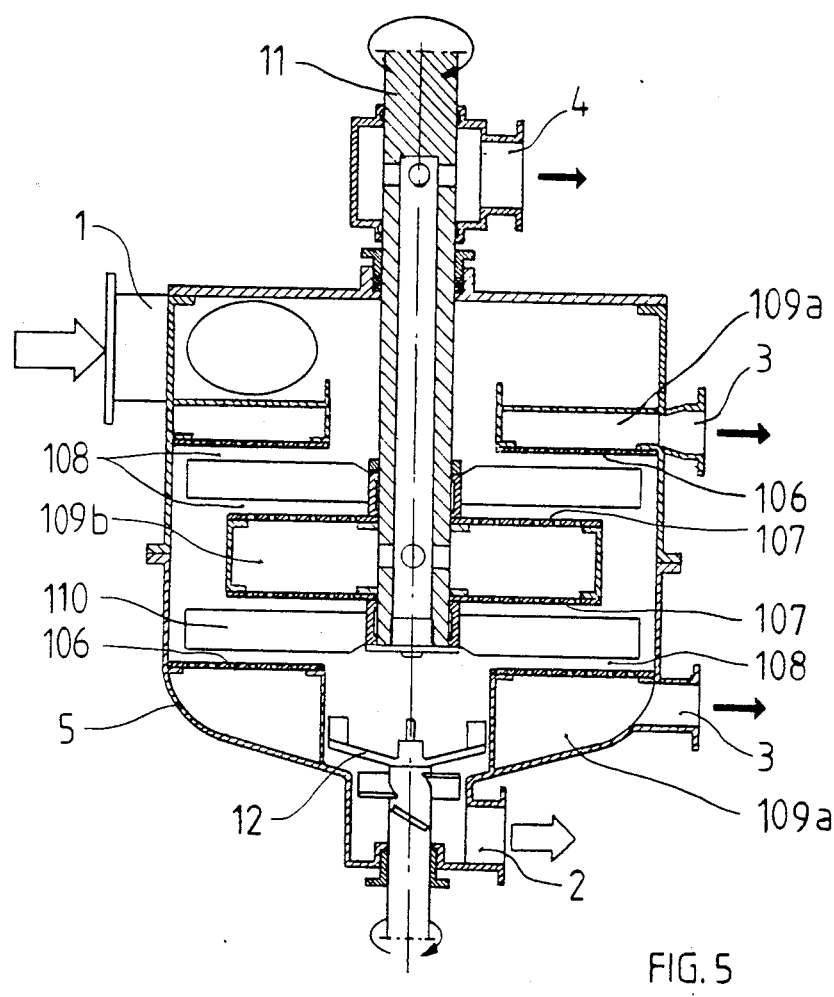
FIG. 5 is a third embodiment of the invention in an illustration corresponding to FIG. 1.

In the embodiment illustrated in FIG. 5 the cylindrical screen surfaces of the thickener have been replaced by horizontal plane screen plates 106, 107, two of which are mounted to the casing of the thickener and two to the shaft rotating in the center of the thickener. The outer peripheries of the rotating screen surfaces are connected via a cylindrical wall to each other in such a way that a filtrate space 109b is formed between the screen surfaces which communicates with an upper filtrate outlet 4 through a channel inside the shaft.

Stationary screen surfaces 106 form either with the bottom of the vessle or with separate walls to separate filtrate spaces 109a which communicate with the filtrate outlets 3. The horizontal vanes 10 in the thickening zone 108 are mounted free on bearings to the shaft.

The invention is not limited to the embodiments illustrated and described here but many modifications are possible within the scope of protection defined by the patent claims. Thus, the capacity of the device can be increase by arranging several concentric screen rings or by installing several plane thickening zones on top of each other.

We claim:

1. A method for thickening a suspension, in particular a pulp containing fibres, comprising thickening the pulp while it flows through a space between two screen surfaces by maintaining a pressure difference, which is required by the thickening, over the screen surfaces causing filtrate to flow through the screen surfaces, and intermittently preventing the pulp from thickening on alternate screen surfaces including by removing pulp thickened on each such alternate screen surface when no filtrate flows through such alternate screen surface.

2. The method as recited in claim 1, wherein the thickening is affected by opening or closing filtrate outlets by closing devices.

3. The method as recited in claim 1, including the step of rotating a vane intermittently in relation to the alternate screen surfaces to clean the surfaces.

4. The method as recited in claim 1, including the step of maintaining the pressure difference over the screen surfaces by pressurizing the feed suspension.

5. Apparatus for thickening a suspension, in particular a pulp containing fibers, the apparatus comprising a closed pressure-proof vessel provided with a pulp inlet, an outlet for the thickened pulp, and at least two filtrate outlets equipped with closing devices; and at least two opposite screen surfaces disposed inside the vessel the space between which constitutes a pulp thickening zone and on the other side of which filtrate spaces are formed; said filtrate spaces lying in communication with waid filtrate outlets, respectively, and being at lower pressure when said closing devices are open to create a pressure difference across the screen to enable filtrate to flow through the screens; wherein at least one of the screen surfaces is stationary and the opposite screen surface rotates around a shaft; and means for intermittently preventing the pulp from thickening on alternate screen surfaces including at least one vane disposed in the thickening zone between the stationary and the rotating screen surfaces at a short distance from the screen surfaces for alternate relative movement in relation to the stationary and to the rotating screen surfaces; and means enabling the closing devices disposed in the filtrate outlets to be intermittently closed to prevent flow of filtrate through the associated screen surface sufficient for pulp thickened on such surface to be removed by relative movement of said one vane and such surface.

6. Apparatus as recited in claim 5 wherein the vane is arranged to rotate free around the rotating screen surface.

7. Apparatus as recited in claim 5 or 6 wherein two cylindrical or conical screen surfaces, one of which is stationary and the other rotates around the shaft, are disposed one inside the other in the vessel.

8. Apparatus as recited in claim 7 wherein the distance between the screen surfaces in the thickening zone is smaller by the pulp inlet than the distance between the screen surfaces by the thickened pulp outlet.

9. Apparatus as recited in claim 7 wherein a pulp feed chamber formed substantially of two plates disposed against each other having large orifices is provided in the thickening zone and vanes are provided between the feed chamber and the screen surfaces.

10. Apparatus as recited in claim 5 wherein said vane is inclined from the perpendicular to guide the thickened pulp from the screen surface and the thickening zone.

11. Apparatus as recited in claim 5 wherein a regulating device is provided between the closing devices to function as a timer.

12. Apparatus as recited in claim 5 wherein a regulating device responsive to the pressure difference is provided between the closing devices.

13. Apparatus as recited in claim 5 wherein the bottom of the vessel is provided with a doctor for guiding the thickened pulp to the outlet.

14. Apparatus as recited in claim 13, wherein the doctor is a means for fluidizing the pulp.

15. A method for thickening a suspension, in particular a pulp containing fibers, comprising the steps of:

(a) flowing pulp to be thickened through a space between first and second screen surfaces;

(b) providing a pressure difference across the screen surfaces causing filtrate to flow through the screen surfaces;

(c) preventing pulp from thickening on the first screen surface by preventing flow of filtrate through the first screen surface and removing pulp therefrom;

(d) subsequently preventing pulp from thickening on the second screen surface by preventing flow of filtrate through the second screen surface and removing pulp therefrom; and (e) thereafter, from time to time, intermittently repeating steps (c) and (d) in that order.

16. The method according to claim 15 including the steps of rotating the first and second screen surfaces relative to one another, disposing a freely rotatably vane in the thickening space between the screen surfaces, wherein step (c) includes preventing relative rotation between the vane and the second screen surface thereby causing relative rotation between the vane and the first screen surface and wherein the step (d) includes preventing relative rotation between the vane and the first screen surface thereby causing relative rotation between the vane and the second screen surface.

17. The method according to claim 15 wherein the step of preventing the flow of filtrate through the first and second screen surfaces includes the step of eliminating the pressure difference across the respective screen surfaces.

* * * * *